(12) United States Patent
Ito

(10) Patent No.: US 6,387,984 B1
(45) Date of Patent: May 14, 2002

(54) AQUEOUS BALLPOINT INK COMPOSITION

(75) Inventor: Tadaaki Ito, Osaku-fu (JP)

(73) Assignee: Sakura Color Products Corporation, Osaka-fu (JP)

(*) Notice: Subject to any disclaimer, the term of this patent is extended or adjusted under 35 U.S.C. 154(b) by 0 days.

(21) Appl. No.: 09/530,232
(22) PCT Filed: Oct. 23, 1998
(86) PCT No.: PCT/JP98/04823
§ 371 Date: Jun. 7, 2000
§ 102(e) Date: Jun. 7, 2000
(87) PCT Pub. No.: WO99/21926
PCT Pub. Date: May 6, 1999

(30) Foreign Application Priority Data

Oct. 28, 1997 (JP) ............................................. 9-312602

(51) Int. Cl.⁷ .......................... C09D 11/18; C08K 3/22; C08K 5/3477
(52) U.S. Cl. ....................... 523/161; 524/100; 524/102; 524/428; 524/497
(58) Field of Search ................................ 523/160, 161; 106/316, 493, 498; 524/428, 431, 497, 100, 102, 190

(56) References Cited

U.S. PATENT DOCUMENTS

| | | | |
|---|---|---|---|
| 4,942,185 A | * 7/1990 | Inoue et al. | 521/54 |
| 5,510,397 A | * 4/1996 | Okuda et al. | 523/161 |
| 5,522,920 A | * 6/1996 | Kawasumi et al. | 106/31.35 |
| 5,580,374 A | * 12/1996 | Okumura et al. | 524/84 |
| 5,712,328 A | * 1/1998 | Inoue et al. | 523/161 |

FOREIGN PATENT DOCUMENTS

| | | | |
|---|---|---|---|
| EP | 685537 | * 12/1995 | |
| JP | 61-60768 | 3/1986 | |
| JP | 63-145380 | 6/1988 | |
| JP | 5-46389 | 7/1993 | |
| JP | 7-3200 | 1/1995 | |
| JP | 8-48930 | 2/1996 | |
| JP | 8-325503 | 12/1996 | |
| JP | 9221617 | * 8/1997 | |

OTHER PUBLICATIONS

English Translation of JP 73200 (1995).*
English Translation of JP 8325503 (1996).*

* cited by examiner

Primary Examiner—Wasu Jagannathan
Assistant Examiner—Callie E Shosho
(74) Attorney, Agent, or Firm—Merchant & Gould P.C.

(57) ABSTRACT

The present invention provides an aqueous ink composition for ball-point pens comprising a titanium oxide as a white pigment, a viscosity modifier and flat-shaped resin particles. The color of the aqueous ink composition can be adjusted by coloring agents (such as a pigment). The viscosity of the aqueous ink composition is 100 cps to 20,000 cps at 20° C. The average particle diameter of said flat-shaped resin particles is 0.05 $\mu$m to 10 $\mu$m and the content thereof is 1% by weight to 35% by weight with respect to the total amount of the aqueous ink composition. The content of the titanium oxide is 5% by weight to 55% by weight with respect to the total amount of the aqueous ink composition. As a viscosity modifier, a polysaccharide is used and the content thereof is 0.1% by weight to 2% by weight with respect to the total amount of the aqueous ink composition.

12 Claims, No Drawings

AQUEOUS BALLPOINT INK COMPOSITION

TECHNICAL FIELD

The present invention relates to an aqueous ink composition for ball-point pens. More specifically, the present invention relates to the improvement of stability to dispersibility and concealing power of an aqueous ink composition for ball-point pens wherein a titanium oxide is contained as a white pigment.

BACKGROUND ART

With regard to a conventional aqueous ink composition, for example, an aqueous ink composition with high viscosity comprising a coloring agent, water, a water-soluble organic solvent, a viscosity modifier and spherical fine particles of polymer has been disclosed in the Japanese Examined Patent Publication No.5-46389. And an aqueous ink composition comprising alkylene-bis-melamine derivatives as a white pigment is disclosed in Japanese Unexamined Patent Publication No.8-48930.

However, in case that a ball-point pen with an ink container tube charged with a conventional aqueous ink composition with high viscosity comprising, for example, the titanium oxide and spherical fine particles of polymer is allowed to stand with its writing tip oriented downward for a long time (for storage, and the like), the titanium oxide contained in the mentioned aqueous ink composition precipitates and non-uniformity of the density of the ink composition arises inside the ink container. This non-uniformity of the density of the ink composition causes clogging at the writing tip and then, the writing characteristic deteriorates. Inside the ink container, the ink composition separates into various layers (such as a layer including the titanium oxide, a layer without the titanium oxide and the like). Thus, with a ball-point pen comprising a transparent or semitransparent ink container, the outward appearance deteriorates.

On the other hand, when the mentioned ball-point pen is allowed to stand with its writing tip oriented upward for a long time (for storage, and the like), the titanium oxide contained in the mentioned aqueous ink composition precipitates at the opposite end of the ink container to the writing tip, so that the titanium oxide has difficulty in flowing out during writing. As a result, its writing portion has poor color development (particularly, that of white color and the like) and the lowered concealing power.

Conventional aqueous ink composition for ball-point pens has the above mentioned disadvantages. Therefore, when a ball-point pen with such an aqueous ink composition (the conventional aqueous ink composition comprising the titanium oxide and spherical fine particles of polymer) is displayed at a shop with its writing tip oriented downward for a long time, the precipitation of the titanium oxide causes a clogging of the ink. On the other hand, when displayed with its writing tip oriented upward, the precipitation of the titanium oxide causes the fall of the color development and concealing power of its writing portion and the value of the ball-point pen as a merchandise lowers. Accordingly, the aqueous ink composition containing the spherical fine particles of polymer has disadvantages in that the stability to the dispersibility is low because of the easy precipitation of the titanium oxide and therefore, the concealing power and the outflow of the ink from the writing tip are not satisfactory.

DISCLOSURE OF THE INVENTION

As a result of intensive study to solve foregoing problems, the present inventor has found that when the aqueous ink composition with high viscosity, wherein flat-shaped resin particles are added instead of spherical resin particles to an aqueous ink composition containing the titanium oxide and the viscosity modifier, is applied to an aqueous ball-point pen, the precipitation of the titanium oxide can be restrained or prevented even after the mentioned ball-point pen is allowed to stand for a long term, and at the same time, the writing characteristic is excellent and its writing portion has high concealing power.

The present invention directs an aqueous ink for ball-point pens containing the flat-shaped resin particles in the aqueous ink composition which contains the titanium oxide as a white pigment and the viscosity modifier.

In addition to the titanium oxide, it is preferable in the present invention to add alkylene-bis-melamine derivatives as a white pigment represented by the formula(1).

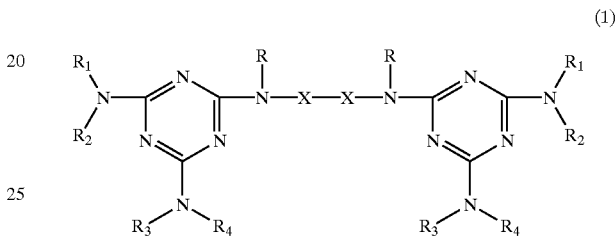

(1)

(wherein R represents a hydrogen atom, an alkyl group having 1 to 4 carbon atoms or an alicyclic group; $R_1$, $R_2$, $R_3$ and $R_4$ are the same or different groups, each of which representing a hydrogen atom or an alkyl group having 1 to 4 carbon atoms; $R_1$ and $R_2$ and/or $R_3$ and $R_4$ may form a heterocyclic group together with nitrogen atom; and X represents an alkylene group having 2 to 3 carbon atoms.)

The object of the invention is to provide an aqueous ink composition for ball-point pens with high concealing power and an excellent ink flow, wherein a precipitation of a titanium oxide in the ink container tube can be prevented even if the titanium oxide is used as a white pigment.

BEST MODE FOR CARRYING OUT THE INVENTION

As above mentioned, Japanese Examined Patent Publication No.5-46389 discloses an aqueous ink composition with high viscosity comprising spherical particles of polymer. Generally, an aqueous ink composition having high viscosity with the viscosity modifier has better stability to dispersibility than does an aqueous ink composition without the viscosity modifier due to the effect of the viscosity modifier or its high viscosity itself. However, in case of preparing an aqueous ink composition using a pigment with a high specific gravity such as the titanium oxide and the like, the precipitation of the pigment (the titanium oxide) is difficult to be prevented with the help of the viscosity modifier alone, and therefore, the stability to the dispersibility of ink composition is low. Moreover, the spherical resin particles (the spherical particles of polymer) are not capable of preventing the precipitation of the titanium oxide and thus, the stability to the dispersibility of the ink composition does not improve sufficiently.

The inventor has noted that the spherical particles of polymer cannot capture the titanium oxide for preventing its precipitation because of their spherical shape. Therefore, in the present invention, the ink composition is prepared with the titanium oxide together with the flat-shaped resin particles.

The flat-shaped resin particles has a low specific gravity (the specific gravity of titanium oxide is about 4; the specific gravity of the flat-shaped resin particles is about 0.7 to about 1.5) and flat-shaped shape, so that they are capable of capturing or covering the titanium oxide easily. Namely, the upper side of the flat-shaped resin particles is suitable for capturing the titanium oxide. And it is easy for the flat-shaped resin particles not only to capture the titanium oxide with its upper side, but also to cover an entire particle of the titanium oxide. As a result, the total specific gravity of the combination of the titanium oxide and the flat-shaped resin particles becomes lower than that of the titanium oxide alone. It seems that during the storage of an aqueous ball-point pen, the precipitation of the titanium oxide can be prevented or restrained owing presumably to this low specific gravity. The flat-shaped resin particles have an excellent stability to the dispersibility because of their low specific gravity and seldom precipitates during the storage. Therefore the flat-shaped resin particles are capable of preventing or restraining the precipitation of the titanium oxide and hence, prevent the non-uniformity of the density (the difference of the density of the ink at the writing tip and at the opposite end of the ink container) from arising inside the ink container tube. Thus, with the use of the present ink composition, the clogging of the ink composition at the writing tip can be prevented even if the ball-point pen is allowed to stand with its writing tip oriented downward. On the other hand, the deterioration of the color development and the concealing power can be prevented even if the ball-point pen is allowed to stand with its writing tip oriented upward.

As a result, with the aqueous ink composition of the present invention, it is possible to provide an aqueous ball-point pen with excellent stability to dispersibility (specifically, the stability to dispersibility of the titanium oxide assured by its capability to prevent or restrain the precipitation of the titanium oxide), high concealing power and an excellent ink flow from the writing tip (or writing characteristic).

Because of their flat shape, the flat-shaped resin particles can cover the written surface more completely than the spherical particles by lining or piling up on the written surface, thus, assuring high concealing power. Moreover, together with the flat-shaped resin particles, quite high concealing power of the titanium oxide can be exhibited more effectively.

The flat-shaped resin particles are thinner than the spherical particles because of their flat shape, and therefore the flat-shaped resin particles flow out more smoothly than the spherical particles with the equivalent average particle diameter from the gap of a ball and a ball supporter of the writing tip of the ball-point pen. Thus, by using the flat-shaped resin particles, an aqueous ink composition for ball-point pens with an excellent ink flow and excellent writing characteristic can be provided. In addition, in the present invention, the average particle diameter of flat-shaped resin particles means the average of particle diameters without the thickness of the particle.

(Titanium oxide)

The titanium oxide in this invention functions as a concealing agent and as a coloring agent. The titanium oxide for use in the present invention is not limited specifically and may be any of various types (such as rutile types, anatase types, and the like) of commercially available titanium oxide. Specific examples of preferable titanium oxide include those commercially available from Titan Kogyo Kabushiki Kaisha under the trade names of "Kronos KR-270", "Kronos KR-270D", "Kronos KR-380", "Kronos KR-380A", "Kronos KR-380B", "Kronos KR-380C", "Kronos KR-380D", "Kronos KR-380N", from Ishihara Sangyo Kaisha, Ltd. under the trade names of "TIPAQUE CR-58", "TIPAQUE CR-602", "TIPAQUE CR-60", "TIPAQUE CR-80", "TIPAQUE CR-63", "TIPAQUE CR-90", "TIPAQUE CR-95", "TIPAQUE CR-93", and from Furukawa Machinery Inc. under the trade names of "TITANIUM DIOXIDE FR-66", "TITANIUM DIOXIDE FR-77", "TITANIUM DIOXIDE FR-41", "TITANIUM DIOXIDE FR-22", "TITANIUM DIOXIDE FR-44" and the like.

The amount of the titanium oxide to be used may vary for example, in the range between 1% by weight and 60% by weight with respect to the total amount of the aqueous ink composition. Preferably, the amount of the titanium oxide to be used is 5% by weight to 55% by weight for example, more preferably, about 15% by weight to about 30% by weight with respect to the total amount of the aqueous ink composition. If the amount thereof is less than 5% by weight with respect to the total amount of the aqueous ink composition, the concealing power and the density of color development lower. On the other hand, if the amount thereof is greater than 55% by weight with respect to the total amount of the aqueous ink composition, the resultant ink composition has an increased viscosity and, hence, deteriorates writing characteristic.

(Flat-shaped resin particles)

Applicable as flat-shaped resin particles are the ones consisting of synthetic resins as follows: olefin-type resins such as polyethylene, polypropylene and the like, vinyl-type resins such as polyvinylchloride and the like, styrene-type resins such as polystyrene and the like, acrylic-type resins such as polymethacrylate (polymethyl methacrylate and the like), polyacrylate and the like, nylon-type resins, fluorine-type resins, amine-type resins and the like. The flat-shaped resin particles consisting of styrene-type resins are preferable to use. The flat-shaped resin particles may be used either alone or as a mixture.

The average particle diameter of the flat-shaped resin particles is preferably not more than 10 μm for a smooth ink flow and so on. More concretely, the average particle diameter may be, for example, 0.05 μm to 10 μm, and preferably, 0.1 μm to 5 μm, and more preferably, about 0.2 μm to about 1 μm. The thickness of the flat-shaped resin particles is preferably about ⅓ to about ⅔ of the said average particle diameter. As above mentioned, the average particle diameter of the flat-shaped resin particles means the average of those diameters of particles without the thickness of particles.

The specific gravity of the flat-shaped resin particles is, for example, in the range between about 0.7 and about 1.5. That is, the flat-shaped resin particles have less gravity than the titanium oxide (the specific gravity of titanium oxide is about 4) and has higher dispersibility. Besides, it forms the writing portion with high concealing power, so that the amount of the titanium oxide to be used can be reduced and as a result, the specific gravity of the aqueous ink composition can be reduced. The specific gravity of resin particles may be measured in the conventional manner for measuring the specific gravity of polymer.

Examples of the flat-shaped resin particles include the solid flat-shaped particles consisting of the mentioned synthetic resins and having the disc like shape (for example, disc of oval-shape or circle and the like). The hole may be provided in the middle of these flat-shaped particles (namely, these may be doughnut-shaped), or a dent may be provided in the middle of at least one side of these flat-shaped particles. The size of the said hole and dent is not specifically limited.

The flat-shaped resin particles may be used in the form of powder, a dispersion prepared with water and/or a water-soluble organic solvent, or an emulsion. To prepare the emulsion, generally used surface active agents are applicable. The concentration of the flat-shaped resin particles in the emulsion is not specifically limited and frequently, about 30% by weight to about 50% by weight with respect to the total amount of the emulsion. The concentration of the flat-shaped resin particles in the dispersion with water and/or a water-soluble organic solvent is neither limited.

Examples of flat-shaped resin particles include that commercially available from Mitsui Toatsu Chemicals, Inc. under the trade name of "Muticle 240D" and the like.

The amount of the flat-shaped resin particles to be used may vary depending on the amount of the titanium oxide and the like. The amount of the flat-shaped resin particles to be used is, for example, 1% by weight to 35% by weight and preferably, about 5% by weight to about 20% by weight with respect to the total amount of the aqueous ink composition. If the amount of the flat-shaped resin particles to be used is less than the aforesaid range, the stability to dispersibility of the aqueous ink composition (specifically, the dispersibility of the titanium oxide) lowers. On the other hand, if the amount is greater than the aforesaid range, the resultant ink composition has an increased solid component and, hence, deteriorates writing characteristic.

In addition, "spherical particles" mean particles of spherical shape or sphere like shape and "flat-shaped particles" mean particles of flat-shaped shape. Thus "flat-shaped particles" include spherical particles crushed to be flat shaped. Particularly, particles having the shape like crushed spherical particles are preferable to be used in the present invention.

(coloring agent)

The color of the present ink composition can be adjusted by utilizing the coloring agent (specifically, the colored coloring agent). The color of the aqueous ink composition without the colored coloring agent is white. However, by utilizing the colored coloring agent the color of ink can be adjusted to various colors according to the request. For example, red, blue, green, yellow, orange, brown, pink, reddish purple, purple, sky blue, yellow green, light purple, dark red, mixed colors of each of these colors and white (such as white tinged blue, white tinged yellow, white tinged pink, white tinged yellow green, and the like) and the like.

The coloring agent for use in the present invention may be any of various kinds of known coloring agents. Examples of coloring agents include inorganic pigments (for example, iron oxide and carbon black and the like), organic pigments (for example, azo-type, condensed polyazo-type, phthalocyanine-type, quinacridone-type, anthraquinone-type, dioxazine-type, indigo-type, thioindigo-type, perinone-type, perylene-type, and melamine-type pigment and the like), colored resins and dyes and the like. The coloring agent may be used either alone or as a mixture.

More specifically, examples of inorganic pigments include, besides the white inorganic pigments such as zinc white, carbon black (for example, furnaceblack, contactblack, thermal black, acetylene black and the like), black iron oxide, yellow iron oxide, red iron oxide, ultramarine blue, Prussian blue, cobalt blue, titanium yellow, turquoise, molybdenum orange and the like. The titanium oxide may also be used as a coloring agent (a white inorganic pigment).

Examples of organic pigments include, besides the white organic pigments such as ethylene-bis-melamine and the like, C.I. PIGMENT RED 2, 3, 5, 17, 22, 38, 41, 48:2, 48:3, 49, 50:1, 53:1, 53:1. 57:1, 58:2, 60, 63:1, 63:2, 64:1, 88, 112, 122, 123, 144, 146, 149, 166, 168, 170, 176, 177, 178, 179, 180, 185, 190, 194, 206, 207, 209, 216, 245; C.I. PIGMENT ORANGE 5, 10, 13, 16, 36, 40, 43; C.I. PIGMENT VIOLET 19, 23, 31, 33, 36, 38, 50; C.I. PIGMENT BLUE 2, 15, 15:1, 15:2, 15:3, 15:4, 15:5, 16, 17, 22, 25, 60, 66; C.I. PIGMENT BROWN 25, 26; C.I. PIGMENT YELLOW 1, 3, 12, 13, 24, 81, 93, 94, 95, 97, 99, 108, 109, 110, 117, 120, 139, 153, 166, 167, 173; C.I. PIGMENT GREEN 7, 10, 36 and the like.

Applicable as a colored resin is the colored resin emulsion prepared by dying (coloring) an aqueous dispersion obtained by emulsion polymerization of one or more resins selected from styrene resins, acrylic resins and acrylonitrile resins with a dye (such as a basic dye or a fluorescent basic dye) and/or a fluorescent brightener. The average particle diameter of the polymer particles of the mentioned aqueous dispersion is not particularly limited and for example, in the range between about 0.1 $\mu$m and about 1 $\mu$m.

As the colored resin, the resin wherein a dye (for example a fluorescent dye and the like) is dissolved may also be used. The pigment may be in the form of a spherical resin or metallic powder.

Examples of dyes include direct dyes (for example C. I. direct black 17, 19, 22, 32, 38, 51, 71; C.I. direct yellow 4, 26, 44, 50; C.I. direct red 1, 4, 23, 31, 37, 39, 75, 80, 81, 83, 225, 226, 227; C.I. direct blue 1, 15, 41, 71, 86, 87, 106, 108, 199 and the like), acid dyes (for example, C.I. acid black 1, 2, 24, 26, 31, 52, 107, 109, 110, 119, 154; C.I. acid yellow 1, 7, 17, 19, 23, 25, 29, 38, 42, 49, 61, 72, 78, 110, 127, 135, 141, 142; C.I. acid red 8, 9, 14, 18, 26, 27, 35, 37, 51, 52, 57, 82, 83, 87, 92, 94, 111, 129, 131, 138, 186, 249, 254, 265, 276; C.I. acid violet 15, 17, 49; C.I. acid blue 1, 7, 9, 15, 22, 23, 25, 40, 41, 43, 62, 78, 83, 90, 93, 100, 103, 104, 112, 113, 158; C.I. acid green 3, 9, 16, 25, 27; C.I. acid orange 56 and the like), food dyes (such as C.I. food yellow 3 and the like), Malachite green (C.I. 4200), Victoria blue FB (C.I.44045), methyl violet FN (C.I.42535), rhodamine F4G (C.I.45160) and rhodamine 6GCP (C.I.45160) and the like.

Preferable coloring agents include pigments (such as inorganic pigments, organic pigments and the like), direct dyes and acid dyes. Specifically, pigments are preferable to be used as a coloring agent. The color of the coloring agent is not limited and the coloring agent may be of any colors (for example, red, blue, green, yellow, orange, brown, pink, reddish purple, purple, sky blue, yellow green, light purple, dark red and the like). The amount of the coloring agent (a pigment, dye and the like) to be used may vary depending on the kind and the specific gravity of the coloring agent and, for example, 0.01% by weight to 10% by weight and preferably, about 0.01% by weight to about 5% by weight with respect to the total amount of the aqueous ink composition. If the amount of the coloring agent to be used is less than 0.01% by weight with respect to the total amount of the aqueous ink composition, the density of the color development of the writing portion lowers. On the other hand, if the amount of the coloring agent to be used is greater than 10% by weight with respect to the total amount of the aqueous ink composition, the resultant ink has an increased viscosity and, hence, deteriorates writing characteristic.

(Viscosity modifier)

Applicable as a viscosity modifier is a conventional viscosity modifier, for example, a water-soluble polymer.

Specifically, a polysaccharide (a natural polysaccharide and the like), a semisynthetic cellulosic polymer, and a water-soluble synthetic polymer are preferable. The viscosity control agent may be used either alone or as a mixture.

Applicable as a polysaccharide is the polymer having a polymer chemical structure consisting of monosaccharides such as glucose, galactose, rhamnose, mannose, glucuronic acid salts and the like. As a polysaccharide, a microbial polysaccharide or derivatives thereof, a water-soluble vegetable polysaccharide or derivatives thereof and a water-soluble animal polysaccharide or derivatives thereof and the like may be used. More specifically, examples of the polysaccharide to be used include a microbial polysaccharide or derivatives thereof such as pulullan, xanthan gum, weran gum, rhamzan gum, succinoglucan and the like, a water-soluble vegetable polysaccharide or derivatives thereof such as guar gum, locust bean gum, tragacanth gum, tara gum, karaya gum, gade gum, arabinogalactan gum, quince seed gum, sayrumseed gum, gum arabic, pectin, starch and the like, a water-soluble animal polysaccharide or derivatives thereof such as gelatin, casein and the like. As a polysaccharide, both natural polysaccharide and synthetic polysaccharide are applicable, but natural polysaccharide is used more often.

Applicable as a semisynthetic cellulosic polymer, for example, methylcellulose, hydroxyethylcellulose, hydroxypropylcellulose, hydroxypropylmethylcellulose, hydroxypropylethylcellulose, carboxymethylcellulose or salts (sodium salt, and the like) thereof and the like may be used. Examples of the water-soluble synthetic polymer include polyvinylpyrrolidone, polyethylene oxide, polyacrylic acid, methylvinylether-maleic anhydride copolymer and the like.

In the present invention, when the polysaccharide is used as a viscosity modifier, the stability to dispersibility of each component (particularly, the titanium oxide) can be improved. As a polysaccharide, particularly, the microbial polysaccharide or derivatives thereof (xanthan gum, weran gum, rhamzan gum, succinoglucan and the like) is preferable to be used. By utilizing such type of polysaccharide, the aqueous ink composition of so-called "gel type" having thixotropic characteristic can be provided.

The amount of the viscosity modifier to be used is not limited and may vary depending on the targeted viscosity of the aqueous ink composition to be prepared. Thus, the amount of the viscosity modifier to be used may vary depending on the kind and the amount of the titanium oxide, the water-soluble organic solvent, water, the flat-shaped resin particles and the other components (the coloring agent, the dispersant and the like).

The aqueous ink composition of the present invention is applicable for a ball-point pen of direct ink supply type. The viscosity of such aqueous ink composition (at 20° C.) is 100 cps to 20,000 cps, preferably 1,000 cps to 12,000 cps and more preferably, 3,000 cps to 9,000 cps in terms of the dispersibility and the writing characteristic of the ink composition. Considering the above-mentioned viscosity and the amount of the other components to be used, the amount of viscosity modifier is 0.1% by weight to 2% by weight, preferably about 0.2% by weight to about 1% by weight with respect to the total amount of the aqueous ink composition.

In the present invention, the basis of the viscosity of the aqueous ink composition is that measured by the viscometer of ELD type (available from Tokimec Inc.) under conditions of rotor=3°×R 14 corn, rotation speed=0.5 rpm, temperature=20° C.

(Water-soluble organic solvent)

The present ink composition may contain a water-soluble organic solvent. The water-soluble organic solvent is used as a prevention against drying up (a moisturizer) of the ink composition. As an applicable water-soluble organic solvent, glycols (for example, ethylene glycol, diethylene glycol and propylene glycol and the like), glycolethers (for example ethyleneglycolmonomethylether and the like), glycerin and trimethylolpropane and the like may be used. The water-soluble organic solvent may be used either alone or as a mixture. The amount of the water-soluble organic solvent to be used is, for example, 1% by weight to 40% by weight, preferably about 5% by weight to about 20% by weight with respect to the total amount of the aqueous ink composition. If the amount thereof is less than aforesaid range, the aqueous ink composition dries easily and the clogging occurs at the writing tip of the ball-point pen. Accordingly, the writing characteristic lowers. On the other hand, the amount thereof exceeds the aforesaidrange, the resultant ink dries too slow after writing.

(Water)

The present aqueous ink composition contains water. The water used commonly to prepare ink compositions (for example ion-exchange water and the like) is applicable. The amount of water to be used is not limited and may vary depending on the kind and the amount of the other components (the titanium oxide, the coloring agent, the viscosity modifier, the water-soluble organic solvent, flat-shaped resin particles and the like) or the targeted viscosity of the aqueous ink composition to be prepared. The amount of water to be used may be selected from the large range, for example, about 1% by weight to about 80% by weight with respect to the total amount of the aqueous ink composition. The preferable amount of water to be used is about 30% by weight to about 70% by weight with respect to the total amount of the aqueous ink composition.

(Dispersant)

In the present invention, said flat-shaped resin particles may be used as a dispersant (particularly, as a dispersant to the titanium oxide), but other dispersant may also be applied or used together. As a dispersant, generally used water-soluble resins, resin emulsions and surface active agents may be used. Although the water-soluble resins may be selected from natural resins, semisynthetic resins or synthetic resins, the synthetic resins are the most preferable in terms of fungi- and corrosion-resistance and viscosity characteristics of the ink composition (the aqueous ink composition for ball-point pen). Examples of such synthetic resins include water-soluble acrylic resins, water-soluble maleic acid resins, water-soluble styrene resins, water-soluble styrene-acrylic resins, water-soluble styrene-maleic acid resins, polyvinyl pyrrolidone, polyvinyl alcohol, water-soluble ester-acrylic resins, water-soluble urethane resins and the like. Examples of resin emulsion include acrylic emulsion, vinyl acetate emulsion, urethane emulsion, styrene-butadiene emulsion and the like. The surface active agent for use in the present invention is any one selected from anionic surface active agents, cationic surface active agents, nonionic surface active agents and amphoteric surface active agents. The preferable dispersant includes water-soluble resins. The dispersant may be used either alone or as a mixture.

The amount of the dispersant to be used is 0.1% by weight to 20% by weight, preferably 0.5% by weight to 15% by weight with respect to the total amount of the aqueous ink composition. If the amount of the dispersant is less than aforesaid range, the dispersion stability is reduced. On the other hand, if the amount of the dispersant is greater than aforesaid range, the resultant ink composition has an increased viscosity and, hence, deteriorates writing characteristics.

(Alkylene-bis-melamine derivatives)

As a white pigment, both the above-mentioned titanium oxide and alkylene-bis-melamine derivatives represented by the following formula (1) can be used together in the present invention. The aqueous ink composition containing the above-mentioned titanium oxide and the alkylene-bis-melamine derivatives represented by the formula (1) makes a writing portion with high concealing power and a ballpoint pen with excellent dispersibility during a long-term storage.

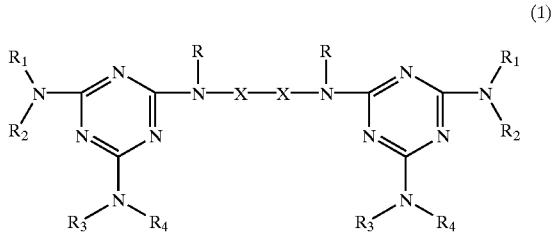

(1)

(wherein R represents a hydrogen atom, an alkyl group having 1 to 4 carbon atoms or an alicyclic group; $R_1$, $R_2$, $R_3$ and $R_4$ are the same or different, each representing a hydrogen atom or an alkyl group having 1 to 4 carbon atoms; $R_1$ and $R_2$, and/or $R_3$ and $R_4$ may form a heterocyclic group together with nitrogen atom; and X represents an alkylene group having 2 to 3 carbon atoms.)

In the above mentioned formula (1), examples of alkylene group R or $R_1$ to $R_4$ include lower alkyl groups having 1 to 4 carbon atoms such as methyl group, ethyl group, n-propyl group, isopropyl group, n-butyl group, s-butyl group, t-butyl group and preferably include methyl group or ethyl group. Examples of alicyclic group of R include alicyclic group of membered ring 5, 6, 7 and the like. The heterocyclic group of $R_1$ to $R_4$ include heterocyclic group of membered ring about 5 to 7. Preferable examples of $R_1$, $R_2$, $R_3$ and $R_4$ include that $R_1$ and $R_2$ is a combination of a hydrogen atom and a lower alkyl group having 2 or 3 carbon atoms and $R_3$ and $R_4$ is a combination of a hydrogen atom and a lower alkyl group having 2 or 3 carbon atoms. More preferably, all of $R_1$ to $R_4$ are hydrogen atoms. An alkylene group of X may be an ethylene group and a propylene group, preferably an ethylene group.

More specifically, as alkylene-bis-melamine derivatives, ethylene-bis-melamine represented by the following formula (2) is applicable. This compound is available from Hakkol chemical Inc. under the trade name of SHIGENOX-OWP.

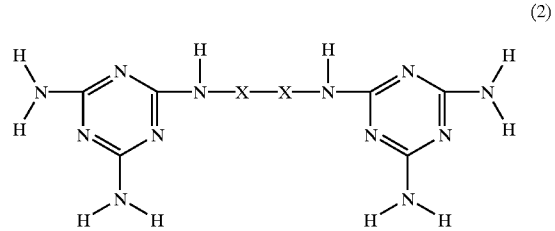

(2)

The alkylene-bis-melamine derivatives have a low specific gravity (the specific gravity of the alkylene-bis-melamine derivatives is about 1.4 and the specific gravity of the titanium oxide is about 4) and excellent stability to dispersibility, but low concealing power. On the other hand, the titanium oxide has a high specific gravity and poor stability to dispersibility, but high concealing power. Thus, when both the alkylene-bis-melamine derivatives and the titanium oxide are contained together in the aqueous ink composition, the concealing power can be improved while an excellent stability to dispersibility can be maintained. Moreover, thanks to the effect of alkylene-bis-melamine derivatives, the color of the ink can be visually recognized through a transparent or a semitransparent ink container tube. A conventional aqueous ink composition prepared by adding thereto a pigment of deep color fails to exhibit its intrinsic color on black paper because the color of the ink is assimilated with the black color of the paper. And a conventional ink composition of a deep color charged in a transparent or a semitransparent ink container tube of a refill for a writing instrument made of polypropylene and the like, exhibits a deeper color in the container tube than the color exhibited on the paper. Specifically, an ink composition of navy blue, violet, green, brown or the like looks almost black in the ink container tube, making it impossible to visually recognize the color thereof through the ink container tube. However, the aqueous ink composition containing the mentioned alkylene-bis-melamine derivatives as a white pigment together with the titanium oxide has excellent stability to dispersibility and high concealing power and further, exhibits the excellent color development on black paper and the color of which can be recognized visually through a transparent or a semitransparent ink container tube.

It is preferable to further add the mentioned flat-shaped resin particles to the above-mentioned aqueous ink composition containing the alkylene-bis-melamine derivative as a white pigment together with the titanium oxide. However, the excellent stability to dispersibility and high concealing power can be assured without adding the flat-shaped resin particles.

The amount of the alkylene-bis-melamine derivatives to be used may be selected within the range 1% by weight to 20% by weight, preferably 5% by weight to 10% by weight with respect to the total amount of the aqueous ink composition. If the amount of alkylene-bis-melamine is less than aforesaid range, the concealing power of its writing portion lowers. On the other hand, if the amount thereof exceeds aforesaid range, the resultant ink has an excessively high viscosity and, hence, deteriorates writing characteristic. The alkylene-bis-melamine derivatives may be used either alone or as a mixture.

When both the titanium oxide and the mentioned alkylene-bis-melamine derivatives are used together, the content of the titanium oxide can be reduced. That is, when both the titanium oxide and the mentioned alkylene-bis-melamine derivatives are used together, a high concealing power can be obtained even if the content of the titanium oxide is low. In this occasion, the content of the titanium oxide can be reduced and thus, the fall of stability to dispersibility caused by the titanium oxide can be restrained or prevented. The amount of the titanium oxide to be used is for example, 4% by weight to 35% by weight, preferably 10% by weight to 20% by weight with respect to the total amount of the aqueous ink composition.

The ratio of the above-mentioned alkylene-bis-melamine derivatives and the titanium oxide to be used is not specifically limited, but it is preferable to contain the titanium oxide in the ratio of 4% by weight to 35% by weight and the alkylene-bis-melamine derivatives, in the ratio of 1% by weight to 20% by weight with respect to the total amount of the aqueous ink composition.

In preparing the above-mentioned aqueous ink composition containing the alkylene-bis-melamine derivatives as a white pigment together with the titanium oxide, not only flat-shaped resin particles but also spherical resin particles or resin particles of other shapes can be used as resin particles (particles of polymer). The resin particles may either be solid or hollow. The hollow particle has the advantage of reducing the specific gravity of resin particles.

The specific gravity of the particles of polymer including the flat-shaped resin particles is lower than that of the titanium oxide (ordinary, about 4) and ordinary about 0.4 to about 1.5. The specific gravity of the particles of polymer can be measured by the conventional method for measuring the specific gravity of polymers. The average particle diameter of the particles of polymer is not more than 10 $\mu$m in terms of smooth ink flow. More specifically, for the spherical particles, of polymer, the average particle diameter is for example, 0.05 $\mu$m to 10 $\mu$m, preferably 0.1 $\mu$m to 5 $\mu$m and more preferably 0.2 $\mu$m to 1 $\mu$m. For the flat-shaped resin particles, the average particle diameter is for example, 0.05 $\mu$m to 10 $\mu$m, preferably 0.1 $\mu$m to 5 $\mu$m and more preferably 0.2 $\mu$m to 1 $\mu$m. The thickness of the flat-shaped resin particles is preferably about 1/3 to about 2/3 of the above-mentioned average particle diameter of the flat-shaped resin particles. The average particle diameter of the flat-shaped resin particles means the average of particle diameters without the thickness.

Moreover, the aqueous ink composition containing the above-mentioned alkylene-bis-melamine derivatives as a white pigment together with the titanium oxide and further including the said flat-shaped resin particles can improve its stability to dispersibility and concealing power still more. As mentioned above, the flat-shaped resin particles, because of their flat-shaped shape, cover the writing surface more completely than the spherical particles by lining or piling up on the writing surface after writing and then, can assure high concealing power. Moreover, the flat-shaped resin particles are thinner and larger in their average particle diameter than the spherical resin particles because of their flat-shaped shape, and therefore, flow out more smoothly from the gap between a ball and a ball supporter of the writing tip of the ball-point pen than the spherical resin particles of the same average particle diameter. Thus, using the flat-shaped resin particles, an aqueous ink composition for ball-point pens with excellent ink flow and writing characteristic can be provided. Accordingly, even when the mentioned ink composition applied on a dark-colored (such as black) paper, the color of the coloring agent may exhibit effectively and the writing characteristic is excellent.

Examples of the particles of polymer, as well as the above-mentioned flat-shaped resin particles, include particles consisting of synthetic resins for example olefin resins such as polyethylene, polypropylene and the like, vinyl resins such as polyvinyl chloride and the like, styrene resins such as polystyrene and the like, methacrylate (polymethyl methacrylate and the like), acrylic resins such as polyacrylate and the like, nylon resins, fluorine resins, amine resins and the like. The particles of polymer may be used either alone or as a mixture.

The particles of polymer may be used in the form of powder, dispersion prepared with water and emulsion. To prepare the emulsion, generally used surface active agent is applicable. The concentration of the particles of polymer in the emulsion is not limited and usually about 30% by weight to about 50% by weight with respect to the total amount of the emulsion.

As applicable particles of polymer, spherical particles are commercially available from Mitsui Toatsu Chemicals, Inc. under the trade name of "MUTICLE PP120".

Applicable hollow particles are commercially available from Rhom & Harse Co. under the trade names of "LOPAQUE HP-91", "LOPAQUE OP-84 J", and from Dainippon Ink and Chemicals, Inc. under the trade names of "VONCOAT PP-2000S", "VONCOAT PP-1000", "VONCOAT PP-1001", "VONCOAT PP-1100".

And as mentioned above, the flat-shaped particles are commercially available from Mitsui Toatsu Chemicals, Inc. under the trade name of "MUTICLE 240D"

The amount of the particles of polymer may vary depending on the amount of the alkylene-bis-melamine derivatives to be used or the amount of the titanium oxide to be used and may be not more than 35% by weight with respect to the total amount of the aqueous ink composition. More specifically, in case of the flat-shaped resin particles, which are the most effective in improving the stability to dispersibility and the concealing power, the amount thereof is 1% by weight to 35% by weight, preferably about 5% by weight to about 20% by weight with respect to the total amount of the aqueous ink composition. If the amount of the particles of polymer to be used is less than 1% by weight with respect to the total amount of the aqueous ink composition, the stability to dispersibility of the aqueous ink composition (specifically, the stability to dispersibility of the titanium oxide) lowers. On the other hand, the amount of the particles of polymer to be used is greater than 35% by weight with respect to the total amount of the aqueous ink composition, the resultant ink composition contains increased solid component, and hence, deteriorates writing characteristic.

In case of the aqueous ink composition containing the alkylene-bis-melamine derivatives as a white pigment together with the titanium oxide, the amount of the viscosity modifier to be used may vary depending on the kind and the amount of the alkylene-bis-melamine derivatives, the titanium oxide, the particles of polymer, the coloring agent, the dispersant and water. However, when the aqueous ink composition of so-called "gel type" is prepared, the viscosity thereof (at 20° C.) is 100 cps to 20,000 cps, preferably 1,000 cps to 12,000 cps, and more preferably 3,000 cps to 9,000 cps in terms of the dispersibility and the writing characteristic of the ink composition as mentioned above. Accordingly, in case of the aqueous ink composition containing the alkylene-bis-melamine derivatives as a white pigment together with the titanium oxide, the amount of the viscosity modifier to be used is, for example, 0.1% by weight to 2% by weight, preferably 0.2% by weight to 1% by weight with respect to the total amount of the aqueous ink composition. In case of the aqueous ink composition without the viscosity modifier, the viscosity (at 20° C.) is preferably not more than 100 cps.

(other additives)

As required, the aqueous ink composition of the present invention may contain conventional additives such as a surface active agent, an anti-foam agent, a leveling agent, an anti-cohesion agent, a pH adjuster, a rust-preventive agent, an antiseptic-antifungel agent, a pseudo-plasticity formation agent, a lubricant and the like. As a surface active agent, the conventional surface active agent (for example, polyoxyethylene-alkyl-ether-phosphate-ester and the like) is applicable. The surface active agent also has a function as a lubricant.

Examples of pH adjusters for use include a caustic soda, a sodium carbonate, an alkanolamine (such as an ethanol amine and the like), an ammonia and the like.

Examples of the lubricant for use include alkali salts or amine salts of n-acyl amino acid-based active agents, ether carboxylic acid-based active agents and N-acyl tauric acid-based active agents, alkali salts of fatty acids, alkanolamine salts, phosphate-based surface active agent and the like. Examples of specific rust-preventive agents usable in the present invention include benzotriazole, derivatives thereof, dicyclohexylammonium-nitrate and the like. Examples of the antiseptic-antifungel agents include potassium sorbate, sodium benzoate, pentachlorophenyl sodium, sodium dihydroacetate and 1,2-benzoisothiazoline-3-on and the like. Among these, 1,2-benzoisothiazoline-3-on is particularly preferable.

(Method of preparation)

The aqueous ink composition of the present invention can be prepared by mixing the titanium oxide, the viscosity modifier, the water-soluble organic solvent, water, the flat-shaped resin particles, and as required, the coloring agent, the dispersant, the additives and so on. For example, previously the titanium oxide dispersion is prepared by introducing the titanium oxide to the water-soluble organic solvent and/or water. In case of using coloring agent, the dispersion of each coloring agent is prepared by introducing the respective coloring agents to the water-soluble organic solvent and/or water. The required amount of the mentioned titanium oxide dispersion, the coloring agent dispersion as required, and the flat-shaped resin particles are mixed together and stirred to prepare the titanium oxide dispersion containing the flat-shaped resin particles. The viscosity modifier, the rest of the water-soluble organic solvent and/or water and as required, other components such as dispersant, additives and so on are introduced into the resultant dispersion of titanium oxide containing the flat-shaped resin particles to obtain an aqueous ink composition. The above mentioned method may be exemplified in the present invention.

The aqueous ink composition containing the alkylene-bis-melamine derivatives as white pigment can be prepared by mixing together the alkylene-bis-melamine derivatives, the titanium oxide, the particles of polymer, the coloring agent, the dispersant, the water-soluble organic solvent, water, the viscosity modifier, the additives, and the like.

More specifically, the aqueous ink composition can be prepared by adding a required amount of the alkylene-bis-melamine derivatives, the titanium oxide, the water-soluble organic solvent and as required, the particles of polymer, the coloring agent, the dispersant, the viscosity modifier, the surface active agent, the additives and the like to a required amount of water and mixing together and stirring.

A preferable method for preparation includes the following. The alkylene-bis-melamine derivatives, the titanium oxide and the water-soluble organic solvent and, as required, the coloring agent, the dispersant, and the additives and the like are introduced into a required amount of water to obtain a pigment dispersant previously. In case of using the particles of polymer, the emulsion containing the particles of polymer is added to the resultant pigment dispersion and mixed together. The viscosity modifier, the rest of the water-soluble organic solvent and/or water, other components (additives and the like) are introduced into the resultant dispersion to obtain an aqueous ink composition.

The aqueous ink composition of the present invention can provide the writing portion with high concealing power. Accordingly, the present aqueous ink composition can provide the ball-point pen which makes a writing portion with excellent color development. As a result, in the present invention, even when the ink of white color is applied on the paper of dark color such as black drawing paper and the like, the writing portion with a vivid white color can be obtained. Of course, with colored ink composition, the writing portion with vivid respective colors can be obtained on the paper of dark color (black drawing paper, and the like). As a paper to be written on, the generally used paper such as a conventional paper for photocopy or colored drawing paper (a paper without any special coating with non-water-soluble resins and the like on its surface) is applicable.

Particularly, the aqueous ink composition comprising the titanium oxide together with the flat-shaped resin particles can improve the dispersibility of the titanium oxide, and hence, the precipitation of the titanium oxide can be restrained or prevented. Accordingly, even if the ball-point pen charged with the present aqueous ink composition is allowed to stand for a long time with its writing tip oriented upward or downward, the non-uniformity of the density of the ink composition at the writing tip and at the opposite end of the ink container tube caused by the precipitation of components of the ink composition (titanium oxide, and the like) can be restricted or prevented. In case of using the flat-shaped resin particles instead of the spherical resin particles, the ball-point pen charged with this aqueous ink composition has excellent ink flow from the writing tip and excellent writing characteristic.

The aqueous ink composition containing the alkylene-bis-melamine derivatives as white pigment adding to the titanium oxide has also excellent long-term stability to dispersibility and high concealing power. Accordingly, when the writing instrument, particularly, a ball-point pen is charged with this ink composition has excellent stability to dispersibility of the ink composition and thus, the non-uniformity of the density of ink composition in the ink container tube (the difference of the density of the ink composition at the writing tip and at the opposite end) can be prevented. That is, the present ink composition can prevent the clogging of the ink at the writing tip even if the ball-point pen is allowed to stand with its writing tip oriented downward and can prevent the deterioration of the color development and concealing power even if the ball-point pen is allowed to stand with its writing tip oriented upward. Accordingly, the aqueous ink composition of the present invention is usable for a writing instrument, particularly for a ball-point pen. Moreover, with a transparent or semitransparent ink container charged with the ink composition, the color of the ink is visually recognized through the ink container tube even if the ink has a dark color.

Because of its high concealing power, even if the ink has dark color (for example navy blue, violet, green, brown and the like), the aqueous ink composition of the present invention can form a writing portion with excellent color development on black paper. Accordingly, this aqueous ink composition can be applied on any of generally-used papers regardless of the color such as a conventional paper for photocopy, a colored drawing paper and the like (the paper without the special coating with non-water-soluble resins and the like on its surface).

Furthermore, the aqueous ink composition of the present invention has a suitable viscosity as an ink for a writing instrument, particularly as an ink for ball-point pens of high viscosity type and thus, is particularly usable for ball-point pens with an ink container of direct ink supply type (ink container adapted to be directly charged with ink for storage). Specifically, with using the polysaccharide as a viscosity modifier, the aqueous ink composition of what is called gel type having thixotropic characteristic is provided easily. The resultant ink composition is usable as an ink composition for ball-point pens.

Exemplary forms of an ink container particularly appreciating the effects of the ink composition of the present invention are as follows: (1) A writing instrument comprising a transparent or semitransparent ink container tube made of a plastic material or the like (for example, polypropylene and the like) which is adapted to be directly charged with an ink imparted with pseudo-plasticity by the viscosity modifier and is clogged with a back-flow preventing material at the tail end thereof, and a pen tip attached at the leading end of the ink container tube and having a ball-point tip formed of German silver or stainless steel as fitted therein; (2) A writing instrument comprising a transparent or semitransparent ink container pipe made of a plastic material or the like which is adapted to be directly charged with ink, an ink flow adjusting mechanism such as of bellows type fittingly attached to the ink container pipe, and a writing tip such as a fiber-bundle tip, nib or ball-point tip made of German silver or stainless steel which is fittingly attached at the leading end of the ink flow adjusting mechanism; (3) A writing instrument comprising a transparent or semitransparent ink container pipe made of a plastic material or the like which is adapted to be directly charged with ink, and a pen tip attached at the leading end of the ink container pipe and having a writing tip such as a ball-point tip fitted therein. The ink container is adapted to adjust the ink flow by way of a ball fitted in the ball-point tip by pressure applied to the interior of the ink container pipe when a cap of the writing instrument is fitted around the main body thereof.

EXAMPLES

The present invention will be further detailed by way of examples and comparative examples thereof, but the present invention will not be limited to these examples.

(preparation of the dispersion of titanium oxide)

17 parts by weight of a varnish (the content of resin is 20% by weight) wherein a styrene-acrylic resin (available from Johnson Polymer Inc. under the trade name of "JOHNCRYL J-679") is neutralized by a sodium hydroxide and 50 parts by weight of the titanium oxide (available from Titan Kogyo Kabushiki Kaisha under trade name of "KRONOS-KR 270") are introduced into a mixture of 10 parts by weight of the propylene glycol and 25 parts by weight of water (ion-exchange water). Then, the mixture is dispersed by a dispersion mixer (bead mill) to prepare a dispersion of the titanium oxide (the percentage of the total amount of the titanium oxide dispersion taken up by the titanium oxide is 50% by weight). The dispersion of the titanium oxide prepared by this method is used in following Examples 1 to 22 and Comparative examples 1 to 8 and called "titanium oxide dispersion" hereinafter.

(Preparation of color base)

17 parts by weight of the varnish (the content of resin is 20% by weight) wherein a styrene-acrylic resin (available from Johnson Polymer Inc. under the trade name of "JOHNCRYL J-679") is neutralized by sodium hydroxide and 17 parts by weight of chlorinated phtalocyanine green (available from Dainippon Ink Chemicals, Inc. under the trade name of "FIRSTGENGREEN B") are introduced into a mixture of 5 parts by weight of the propylene glycol and 61 parts by weight of ion-exchange water. Then, the mixture is dispersed by a dispersion mixer (bead mill) to prepare a green pigment dispersion (the percentage of the total amount of the dispersion taken up by the chloric phtalocyanine green is 17% by weight). This dispersion (hereinafter mentioned as "color base") is used in following Examples 1 to 22 and Comparative examples 1 to 8.

(Preparation of a water solution of viscosity modifier)

Xanthan gum (available from Sansho Co,.Ltd. under the trade name of "KELZAN") is introduced into ion-exchange water and stirred to prepare a water solution of the xanthan gum. (the percentage of the total amount of the water solution taken up by the xanthan gum is 2% by weight). This water solution of the xanthan gum (hereinafter mentioned as "gum component") is used in following Examples 1 to 22 and Comparative examples 1 to 8.

(Preparation of dispersion of alkylene-bis-melamine derivatives)

17 parts by weight of the varnish (the content of resin is 20% by weight) wherein a styrene-acrylic resin (available from Johnson Polymer Inc. under the trade name of "JOHNCRYL J-679") is neutralized by sodium hydroxide and 30 parts by weight of ethylene-bis-melamine (available from Hakkol Chemical Inc. under the trade name of "SHIGENOX-OWP") are introduced into a mixture of 10 parts by weight of the propylene glycol and 43 parts by weight of ion-exchange water. Then, the mixture is dispersed by a dispersion mixer (beads mill) to prepare a dispersion of ethylene-bis-melamine (the percentage of the total amount of the dispersion taken up by the ethylene-bis-melamine is 30% by weight). This dispersion of ethylene-bis-melamine (hereinafter mentioned as "ethylene-bis-melamine dispersion") is used in following Examples 6 to 22 and Comparative examples 6 to 8.

(Example of employment of particles of polymer)

The spherical resin particles and the flat-shaped resin particles are used in Examples as particles or polymer. These particles of polymer are used in the form of emulsion containing particles of polymer.

That available from Mitsui Toatsu Chemicals, Inc. under the trade name of "Muticle 240D" is used as an emulsion containing the flat-shaped resin particles (the average particle diameter of flat-shaped resin particles: 0.5 $\mu$m, solid content: 44% by weight).

That available from Mitsui Toatsu Chemicals, Inc. under the trade name of "Muticle PP120" is used as an emulsion containing the spherical resin particles (the average particle diameter of spherical resin particles: 0.7 $\mu$m, solid content: 45% by weight)

(Preparation of aqueous ink composition)

Those aqueous ink compositions of Examples 1 to 22 and Comparative Examples 1 to 8 are prepared according to the composition shown in table 1 to table 4. More concretely, those aqueous compositions are prepared as follows.

Example 1

40 parts by weight of the titanium oxide dispersion and 22.7 parts by weight of the emulsion containing the flat-shaped resin particles (available from Mitsui Toatsu Chemicals, Inc. under the trade name of "Muticle 240D"; the average particle diameter of flat-shaped particles: 0.5 $\mu$m, solid content: 44% by weight) are mixed together. Then, 16 parts by weight of the gum component and 21.3 parts by weight of ion-exchange water are introduced into the resultant mixture and mixed together to prepare an aqueous ink composition of white color.

The viscosity of this aqueous ink composition is 7,100 cps at 20° C. The viscosity is measured by the viscometer of ELD type (available from Tokimec Inc.) under conditions of rotor=3°×R 14 corn, rotation speed=0.5 rpm, temperature= 20° C. In the following Examples 2 to 5 and the Comparative Examples 1 to 5, the viscosity is measured under the same condition as this Example 1.

Example 2

An aqueous ink composition of white color is prepared in the same manner as described in Example 1, except that 22.7 parts by weight of the emulsion containing the flat-shaped resin particles (available from Mitsui Toatsu Chemicals, Inc. under the trade name of "Muticle 240D"; the average particle diameter of the flat-shaped resin particles: 0.5 µm, solid content: 44% by weight) is replaced with 34 parts by weight of the emulsion containing the flat-shaped resin particles (available from Mitsui Toatsu Chemicals, Inc. under the trade name of "Muticle 240D") and 21.3 parts by weight of ion-exchange water is replaced with 10 parts by weight of the ion-exchange water. The viscosity of this aqueous ink composition (at 20° C.) is 7,400 cps.

Example 3

An aqueous ink composition of green color is prepared in the same manner as described in Example 1, except that 21.3 parts by weight of the ion-exchange water is replaced with 21.3 parts by weight of the color base. The viscosity of this aqueous ink composition (at 20° C.) is 7,250 cps.

Example 4

An aqueous ink composition of white color is prepared in the same manner as described in Example 1, except that 40 parts by weight of the titanium oxide dispersion is replaced with 50 parts by weight of the titanium oxide dispersion and 21.3 parts by weight of ion-exchange water is replaced with 11.3 parts by weight of the ion-exchange water. The viscosity of this aqueous ink composition (at 20° C.) is 8,200 cps.

Example 5

An aqueous ink composition of white color is prepared in the same manner as described in Example 1, except that 40 parts by weight of the titanium oxide dispersion is replaced with 50 parts by weight of the titanium oxide dispersion, 22.7 parts by weight of the emulsion containing the flat-shaped resin particles (available from Mitsui Toatsu Chemicals, Inc. under the trade name of "Muticle 240D"; the average particle diameter of flat-shaped particles: 0.5 µm, solid content: 44% by weight) is replaced with 34 parts by weight of the emulsion containing the flat-shaped resin particles (available from Mitsui Toatsu Chemicals, Inc. under the trade name of "Muticle 240D") and 21.3 parts by weight of ion-exchange water is excluded. The viscosity of this aqueous ink composition is (at 20° C.) 8,500 cps.

Example 6

10 parts by weight of the ethylene-bis-melamine dispersion and 40 parts by weight of the titanium oxide dispersion are mixed together. Then, 50 parts by weight of ion-exchange water is introduced into the resultant mixture and mixed together to prepare an aqueous ink composition of white color.

The viscosity of this aqueous ink composition is 4,000 cps at 20° C. The viscosity is measured by the viscometer of ELD type (available from Tokimec Inc.) under conditions of rotor=3°×R 24 corn, rotation speed=0.5 rpm, temperature=20° C. In the following Examples 7 to 22 and Comparative Examples 6 to 8, the viscosity is measured under the same condition as this Example 6.

Example 7

10 parts by weight of the ethylene-bis-melamine dispersion and 40 parts by weight of the titanium oxide dispersion are mixed together. Then, 16 parts by weight of the gum component and 34 parts by weight of ion-exchange water are introduced into the resultant mixture and mixed together to prepare an aqueous ink composition of white color. The viscosity of this aqueous ink composition is 6,500 cps at 20° C.

Example 8

20 parts by weight of the ethylene-bis-melamine dispersion and 40 parts by weight of the titanium oxide dispersion are mixed together. Then, 16 parts by weight of the gum component and 24 parts by weight of ion-exchange water are introduced into the resultant mixture and mixed together to prepare an aqueous ink composition of white color. The viscosity of this aqueous ink composition is 6,800 cps at 20° C.

Example 9

10 parts by weight of the ethylene-bis-melamine dispersion, 40 parts by weight of the titanium oxide dispersion and 21.3 parts by weight of the color base are mixed together. Then, 16 parts by weight of the gum component and 12.7 parts by weight of ion-exchange water are introduced into the resultant mixture and mixed together to prepare an aqueous ink composition of green color. The viscosity of this aqueous ink composition is 7,400 cps at 20° C.

Example 10

10 parts by weight of the ethylene-bis-melamine dispersion and 50 parts by weight of the titanium oxide dispersion are mixed together. Then, 16 parts by weight of the gum component and 24 parts by weight of ion-exchange water are introduced into the resultant mixture and mixed together to prepare an aqueous ink composition of white color. The viscosity of this aqueous ink composition is 7,600 cps at 20° C.

Example 11

20 parts by weight of the ethylene-bis-melamine dispersion and 50 parts by weight of the titanium oxide dispersion are mixed together. Then, 16 parts by weight of the gum component and 14 parts by weight of ion-exchange water are introduced into the resultant mixture and mixed together to prepare an aqueous ink composition of white color. The viscosity of this aqueous ink composition is 8,000 cps at 20° C.

Example 12

10 parts by weight of the ethylene-bis-melamine dispersion, 50 parts by weight of the titanium oxide dispersion and 21.3 parts by weight of the color base are mixed together. Then, 16 parts by weight of the gum component and 2.7 parts by weight of ion-exchange water are introduced into the resultant mixture and mixed together to prepare an aqueous ink composition of green color. The viscosity of this aqueous ink composition is 8,200 cps at 20° C.

Example 13

10 parts by weight of the ethylene-bis-melamine dispersion and 40 parts by weight of the titanium oxide dispersion are mixed together. 22.7 parts by weight of the emulsion containing flat-shaped resin particles are added into the mixture and mixed. Then, 16 parts by weight of the gum component and 11.3 parts by weight of ion-exchange water are introduced into the resultant mixture and mixed together to prepare an aqueous ink composition of white color. The viscosity of this aqueous ink composition is 7,500 cps at 20° C.

Example 14

10 parts by weight of the ethylene-bis-melamine dispersion and 40 parts by weight of the titanium oxide dispersion are mixed together. 22.7 parts by weight of the emulsion containing the spherical resin particles are added into the mixture and mixed. Then, 16 parts by weight of the gum component and 11.3 parts by weight of ion-exchange water are introduced into the resultant mixture and mixed together to prepare an aqueous ink composition of white color. The viscosity of this aqueous ink composition is 7,500 cps at 20° C.

Example 15

10 parts by weight of the ethylene-bis-melamine dispersion and 40 parts by weight of the titanium oxide dispersion are mixed together. 34 parts by weight of the emulsion containing the flat-shaped resin particles are added into the mixture and mixed. Then, 16 parts by weight of the gum component are introduced into the resultant mixture and mixed together to prepare an aqueous ink composition of white color. The viscosity of this aqueous ink composition is 7,800 cps at 20° C.

Example 16

10 parts by weight of the ethylene-bis-melamine dispersion and 40 parts by weight of the titanium oxide dispersion are mixed together. 34 parts by weight of the emulsion containing the spherical resin particles are added into the mixture and mixed. Then, 16 parts by weight of the gum component are introduced into the resultant mixture to prepare an aqueous ink composition of white color. The viscosity of this aqueous ink composition is 7,900 cps at 20° C.

Example 17

10 parts by weight of the ethylene-bis-melamine dispersion, 40 parts by weight of the titanium oxide dispersion and 21.3 parts by weight of the color base are mixed together. 18.7 parts by weight of the emulsion containing the flat-shaped resin particles are added into the mixture and mixed. Then, 10 parts by weight of the gum component are introduced into the resultant mixture and mixed together to prepare an aqueous ink composition of green color. The viscosity of this aqueous ink composition is 6,000 cps at 20° C.

Example 18

10 parts by weight of the ethylene-bis-melamine dispersion, 40 parts by weight of the titanium oxide dispersion and 21.3 parts by weight of the color base are mixed together. 18.7 parts by weight of the emulsion containing the spherical resin particles are added into the mixture and mixed. Then, 10 parts by weight of the gum component are introduced into the resultant mixture to prepare an aqueous ink composition of green color. The viscosity of this aqueous ink composition is 5,900 cps at 20° C.

Example 19

10 parts by weight of the ethylene-bis-melamine dispersion and 50 parts by weight of the titanium oxide dispersion are mixed together. 22.7 parts by weight of the emulsion containing the flat-shaped resin particles are added into the mixture and mixed. Then, 10 parts by weight of the gum component and 7.3 parts by weight of ion-exchange water are introduced into the resultant mixture and mixed together to prepare an aqueous ink composition of white color. The viscosity of this aqueous ink composition is 6,100 cps at 20° C.

Example 20

10 parts by weight of the ethylene-bis-melamine dispersion and 50 parts by weight of the titanium oxide dispersion are mixed together. 22.7 parts by weight of the emulsion containing the spherical resin particles are added into the mixture and mixed. Then, 10 parts by weight of the gum component and 7.3 parts by weight of ion-exchange water are introduced into the resultant mixture and mixed together to prepare an aqueous ink composition of white color. The viscosity of this aqueous ink composition is 6,100 cps at 20° C.

Example 21

10 parts by weight of the ethylene-bis-melamine dispersion and 50 parts by weight of the titanium oxide dispersion are mixed together. 30 parts by weight of the emulsion containing the flat-shaped resin particles are added into the mixture and mixed. Then, 10 parts by weight of the gum component are introduced into the resultant mixture and mixed together to prepare an aqueous ink composition of white color. The viscosity of this aqueous ink composition is 6,500 cps at 20° C.

Example 22

10 parts by weight of the ethylene-bis-melamine dispersion and 50 parts by weight of the titanium oxide dispersion are mixed together. 30 parts by weight of the emulsion containing the spherical resin particles are added into the mixture and mixed. Then, 10 parts by weight of the gum component are introduced into the resultant mixture and mixed together to prepare an aqueous ink composition of white color. The viscosity of this aqueous ink composition is 6,700 cps at 20° C.

Comparative Example 1

An aqueous ink composition of white color is prepared in the same manner as described in Example 1, except that 22.7 parts by weight of the emulsion containing the flat-shaped resin particles (available from Mitsui Toatsu Chemicals, Inc. under the trade name of "Muticle 240D"; the average particle diameter of the flat-shaped resin particles: 0.5 μm, solid content: 44% by weight) are replaced with 22.7 parts by weight of the emulsion containing the spherical resin particles (available from Mitsui Toatsu Chemicals, Inc. under the trade name of "Muticle PP120"; the average particle diameter of the spherical resin particles: 0.7 μm, solid content: 45% by weight). The viscosity of this aqueous ink composition (at 20° C.) is 6,800 cps.

Comparative Example 2

An aqueous ink composition of white color is prepared in the same manner as described in Example 2, except that 34 parts by weight of the emulsion containing the flat-shaped resin particles (available from Mitsui Toatsu Chemicals, Inc. under the trade name of "Muticle 240D"; the average particle diameter of the flat-shaped resin particles: 0.5 μm, solid content: 44% by weight) are replaced with 34 parts by weight of the emulsion containing the spherical resin particles (available from Mitsui Toatsu Chemicals, Inc. under the trade name of "Muticle PP120"; the average particle diameter of the spherical resin particles: 0.7 μm, solid content: 45% by weight). The viscosity of this aqueous ink composition (at 20° C.) is 7,600 cps.

Comparative Example 3

An aqueous ink composition of green color is prepared in the same manner as described in Example 3, except that 22.7 parts by weight of the emulsion containing the flat-shaped resin particles (available from Mitsui Toatsu Chemicals, Inc. under the trade name of "Muticle 240D"; the average particle diameter of the flat-shaped resin particles: 0.5 μm, solid content: 44% by weight) are replaced with 22.7 parts by weight of the emulsion containing the spherical resin particles (available from Mitsui Toatsu Chemicals, Inc. under the trade name of "Muticle PP120"; the average particle diameter of the spherical resin particles: 0.7 μm, solid content: 45% by weight). The viscosity of this aqueous ink composition (at 20° C.) is 7,200 cps.

Comparative Example 4

An aqueous ink composition of white color is prepared in the same manner as described in Example 4, except that 22.7 parts by weight of the emulsion containing the flat-shaped resin particles (available from Mitsui Toatsu Chemicals, Inc. under the trade name of "Muticle 240D"; the average particle diameter of the flat-shaped resin particles: 0.5 μm, solid content: 44% by weight) are replaced with 22.7 parts by weight of the emulsion containing the spherical resin particles (available from Mitsui Toatsu Chemicals, Inc. under the trade name of "Muticle PP120"; the average particle diameter of the spherical resin particles: 0.7 μm, solid content: 45% by weight). The viscosity of this aqueous ink composition (at 20° C.) is 8,000 cps.

Comparative Example 5

An aqueous ink composition of white color is prepared in the same manner as described in Example 5, except that 34 parts by weight of the emulsion containing the flat-shaped resin particles (available from Mitsui Toatsu Chemicals, Inc. under the trade name of "Muticle 240D"; the average particle diameter of the flat-shaped resin particles: 0.5 μm, solid content: 44% by weight) are replaced with 34 parts by weight of the emulsion containing the spherical resin particles (available from Mitsui Toatsu Chemicals, Inc. under the trade name of "Muticle PP120"; the average particle diameter of the spherical resin particles: 0.7 μm, solid content: 45% by weight). The viscosity of this aqueous ink composition (at 20° C.) is 8,600 cps.

Comparative Example 6

16 parts by weight of the gum component and 64 parts by weight of ion-exchange water are introduced into 20 parts by weight of the ethylene-bis-melamine dispersion and mixed together to prepare an aqueous ink composition of white color. The viscosity of this aqueous ink composition is 4,000 cps at 20° C.

Comparative Example 7

21.3 parts by weight of color base are introduced to 20 parts by weight of the ethylene-bis-melamine dispersion and mixed together. Then, 16 parts by weight of the gum component and 42.7 parts by weight ion-exchange water are introduced to the resultant mixture and mixed to prepare an aqueous ink composition of green color. The viscosity of this aqueous ink composition is 4,200 cps at 20° C.

Comparative Example 8

16 parts by weight of the gum component and 24 parts by weight of ion-exchange water are introduced into 60 parts by weight of the titanium oxide dispersion and mixed together to prepare an aqueous ink composition of white color. The viscosity of this aqueous ink composition is 8,500 cps at 20° C.

TABLE 1

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Titanium oxide dispersion | 40 | 40 | 40 | 50 | 50 | 40 | 40 | 40 | 50 | 50 |
| Color base |  |  | 21.3 |  |  |  |  | 21.3 |  |  |
| Emulsion containing flat-shaped resin particles | 22.7 | 34 | 22.7 | 22.7 | 34 |  |  |  |  |  |
| Emulsion containing spherical resin particles |  |  |  |  |  | 22.7 | 34 | 22.7 | 22.7 | 34 |
| Gum component | 16 | 16 | 16 | 16 | 16 | 16 | 16 | 16 | 16 | 16 |
| Ion-exchange water | 21.3 | 10 |  | 11.3 |  | 21.3 | 10 |  | 11.3 |  |

TABLE 2

|  | Examples | | | | | | |
| --- | --- | --- | --- | --- | --- | --- | --- |
|  | 6 | 7 | 8 | 9 | 10 | 11 | 12 |
| Ethylene-bis-melamine dispersion | 10 | 10 | 20 | 10 | 10 | 20 | 10 |
| Titanium oxide dispersion | 40 | 40 | 40 | 40 | 50 | 50 | 50 |
| Color base |  |  |  | 21.3 |  |  | 21.3 |
| Gum component |  | 16 | 16 | 16 | 16 | 16 | 16 |
| Ion-exchange water | 50 | 34 | 24 | 12.7 | 24 | 14 | 2.7 |

TABLE 3

| | Examples | | | | | | | | | |
|---|---|---|---|---|---|---|---|---|---|---|
| | 13 | 14 | 15 | 16 | 17 | 18 | 19 | 20 | 21 | 22 |
| Ethylene-bis melamine dispersion | 10 | 10 | 10 | 10 | 10 | 10 | 10 | 10 | 10 | 10 |
| Titanium oxide dispersion | 40 | 40 | 40 | 40 | 40 | 40 | 50 | 50 | 50 | 50 |
| Color base | | | | | 21.3 | 21.3 | | | | |
| Emulsion contaning flat-shaped resin particles | 22.7 | | 34 | | 18.7 | | 22.7 | | 30 | |
| Emulsion contaning spherical resin particles | | 22.7 | | 34 | | 18.7 | | 22.7 | | 30 |
| Gum component | 16 | 16 | 16 | 16 | 10 | 10 | 10 | 10 | 10 | 10 |
| Ion-exchange water | 11.3 | 11.3 | | | | | 7.3 | 7.3 | | |

TABLE 4

| | Comparative examples | | |
|---|---|---|---|
| | 6 | 7 | 8 |
| Ethylene bis-melamine dispersion | 20 | 20 | |
| Titanium oxide dispersion | | | 60 |
| Color base | | 21.3 | |
| Gum component | 16 | 16 | 16 |
| Ion-exchange water | 64 | 42.7 | 24 |

(Evaluation of the Examples)

Each of aqueous ink compositions prepared in Examples 1 to 5 and Comparative Examples 1 to 5 is filled in an ink container of direct ink supply type. Each of these ink containers is installed in a writing instrument with a writing tip of ball (a ball-point pen). After writing portions are formed with these ball-point pens on a black drawing paper, the concealing power or the color development of the writing portions is evaluated by the following test. The stability to dispersibility of the ink composition (The stability to dispersibility under conditions of centrifugation, during the storage with the writing tip oriented downward and during the storage with the writing tip oriented upward) and the writing characteristic of these ball-point pens are evaluated by the following test. The test results are shown in Table 5.

Each of aqueous ink compositions prepared in Examples 6 to 22 and Comparative Examples 6 to 8 is filled in an ink container of direct ink supply type. Each of these ink containers is installed in a writing instrument with a writing tip of ball (ball-pointpen). After writing portions are formed with these ball-point pens on the black drawing paper, the concealing power and the color development of the writing portion are evaluated by the following test. The stability to dispersibility of ink composition (the stability to dispersibility under conditions of centrifugation, during the storage with its writing tip oriented downward and during the storage with its writing tip oriented upward) and the writing characteristic of these ball-point pens is evaluated by the following test. The test results are shown in table 6 and table 7.

(Concealing power or color development test)

Visual inspections are carried out to evaluate the concealing power or the color development of the writing portion formed on a black drawing paper on a following basis. The test result is shown in "concealing power or color development test" of the table.

I: the color of the writing portion is vivid
II: the color of the writing portion is black tinged white or black tinged green
III: the color of the writing portion is black (Stability to dispersibility test by centrifugation)

Each of those ball-point pens charged with aqueous ink compositions prepared in Examples 1 to 22 and Comparative Examples 1 to 8 is set in the centrifuge (available from Kokusan Centrifuge Products Inc. under the trade name of "H-103N$_3$") with its writing tip oriented outward (namely, the opposite end to the writing tip oriented to the inside of the rotation of the centrifugation), and centrifuged (rotation speed: 2,000 rpm, time: 5 minutes, the distance from the center of rotation to the writing tip: 15 cm). Then, the degree of the precipitation of the titanium oxide (the dispersibility of the ink composition) is inspected by X-ray and evaluated on the following basis. The test result is shown in "dispersibility test by centrifugation" of table 5 to table 7.

I: the concentration of the solid component (the titanium oxide) at the writing tip of the ball-point pen doesnt change between before and after the centrifugation and the writing characteristic doesn't present any difference between before and after the centrifugation.

II: the concentration of the solid component (the titanium oxide) at the writing tip of the ball-point pen changes a little between before and after the centrifugation; the concentration of the titanium oxide at the writing tip increases a little and the writing characteristic deteriorates a little after the centrifugation.

III: the concentration of the solid component (the titanium oxide) at the writing tip of the ball-point pen changes remarkably between before and after the centrifugation; the concentration of the titanium oxide at the writing tip increases greatly and the writing characteristic deteriorates greatly after the centrifugation.

(Stability test to dispersibility by the storage with the writing tip oriented downward)

Each of those ball-point pens charged with aqueous ink compositions prepared in Examples 1 to 22 and Comparative Examples 1 to 8 is allowed to stand with its writing tip oriented downward at room temperature (between about 20° C. and about 25° C.) for 30 days. The degree of the precipitation of the titanium oxide (the dispersibility of the ink composition) is evaluated on the following basis. The test result is shown in "dispersibility test by storage oriented downward" of table 5 to table 7.

I: The concentration of the solid component (the titanium oxide) at the writing tip of the ball-point pen doesn't change at all between before and after the storage and the writing characteristic doesn't present any difference between before and after the storage.

II: The concentration of the solid component (the titanium oxide) at the writing tip of the ball-point pen change a little; the concentration of the titanium oxide at the writing tip increases a little and the writing characteristic deteriorates a little after the storage.

III: The concentration of the solid component (the titanium oxide) at the writing tip of the ball-point pen changes remarkably; the concentration of the titanium oxide at the writing tip increases greatly and the writing characteristic deteriorates greatly after the storage.

(Stability test to dispersibility by storage with the writing tip oriented upward)

Each of those ball-point pens charged with aqueous ink compositions prepared in Examples 1 to 22 and Comparative Examples 1 to 8 is allowed to stand with its writing tip oriented upward at room temperature (between about 20° C. and about 25° C.) for 30 days. The degree of the precipitation of the titanium oxide (the dispersibility of the ink composition) is evaluated on the following basis. The test result is shown in "dispersibility test by storage oriented upward" of table 5 to table 7.

I: The concentration of the solid component (the titanium oxide) at the writing tip of the ball-point pen doesn't change at all and the writing characteristic doesn't present any difference between before and after the storage.

II: The concentration of the solid component (the titanium oxide) at the writing tip of the ball-point pen changes a little between before and after the storage; the concentration of the titanium oxide at the writing tip falls a little and when applied on a black drawing paper after the storage, the color development of the writing portion is insufficient and the writing portion is tinged with black.

III: The concentration of the solid component (the titanium oxide) at the writing tip of the ball-point pen changes remarkably between before and after the storage; the concentration of the titanium oxide at the writing tip falls greatly and when applied on a black drawing paper after the storage, the writing portion is black and the color of liquid flowing out of the writing tip is transparent or transparent tinged with green.

(Writing characteristic test)

Ten persons are chosen randomly. Each person writes at least more than 100 letters with each of those ball-point pens charged with aqueous ink compositions prepared in Example 1 to 22 and Comparative Example 1 to 8 and evaluates the writing characteristic of each ball-point pen on their own basis. Then, the writing characteristic is evaluated generally on the following basis. This general evaluation of the writing characteristic is shown in "writing characteristic test" of table 5 to table 7.

I: More than 7 persons evaluate that the writing characteristic is good.

II: 5 or 6 persons evaluate that the writing characteristic is good.

III: 1 to 4 persons evaluate that the writing characteristic is good.

IV: Nobody evaluates that the writing characteristic is good.

(Outward appearance test)

Visual inspections are carried out to determine if the colors of the ink compositions contained in the respective ink container can be recognized under natural light (indoor, in the daytime). The basis for evaluation is as follows. The test result is shown in "outward appearance test" of table 6 and 7.

I: The color of the ink composition contained in the respective ink container can be visually recognized clearly through the ink container.

II: The color of the ink composition contained in the respective ink container can be visually recognized through the ink container.

III: The color of the ink compositions contained in the respective ink container cannot be visually recognized through the ink container.

TABLE 5

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Concealing power or color development test | I | I | I | I | I | I | I | I | I | I |
| Dispersibility test by the centrifugation | I | I | I | I | I | III | III | III | III | III |
| Dispersibility test by storage oriented downward | I | I | I | I | I | III | III | III | III | III |
| Dispersibility test by storage oriented upward | I | I | I | I | I | III | III | III | III | III |
| Writing characteristic test | I | I | I | I | I | I | I | I | II | II |

TABLE 6

|  | Examples | | | | | | | Comparative Examples | | |
| --- | --- | --- | --- | --- | --- | --- | --- | --- | --- | --- |
|  | 6 | 7 | 8 | 9 | 10 | 11 | 12 | 6 | 7 | 8 |
| Concealing power or color development test | I | I | I | I | I | I | I | III | III | II |
| Outward appearance test | I | I | I | I | I | I | I | IV | IV | IV |
| Dispersibility test by the Centrifugation | III~II | II | II | II | II | II | II | II | II | IV |
| Dispersibility test by storage with the writing tip oriented upward | III~II | II | II | II | II | II | II | II | II | IV |
| Dispersibility test by storage with the writing tip oriented downward | III~II | II | II | II | II | II | II | II | II | IV |
| Writing characteristic test | I | I | I | I | I | I | I | III | III | III |

TABLE 7

|  | Examples | | | | | | | | | |
| --- | --- | --- | --- | --- | --- | --- | --- | --- | --- | --- |
|  | 13 | 14 | 15 | 16 | 17 | 18 | 19 | 20 | 21 | 22 |
| Concealing power or color development test | I | I | I | I | I | I | I | I | I | I |
| Outward appearance test | I | II | I | II | I | II | I | II | I | II |
| Dispersibility test by the Centrifugation | I | II | I | II | I | II | I | II | I | II |
| Dispersibility test by storage oriented downward | I | II | I | II | I | II | I | II | I | II |
| Dispersibility test by | I | II | I | II | I | II | I | II | I | II |

TABLE 7-continued

| | Examples | | | | | | | | | |
|---|---|---|---|---|---|---|---|---|---|---|
| | 13 | 14 | 15 | 16 | 17 | 18 | 19 | 20 | 21 | 22 |
| storage oriented upward Writing characteristic test | I | II | I | II | I | II | I | II | I | II |

(Result)

As can be understood from the table 5, those ball-point pens charged with aqueous ink compositions prepared in Example 1 to 5 which contain the flat-shaped resin particles can form writing portions with high concealing power and excellent color development. Moreover, even when forced to separate by the centrifugation, those ball-point pens charged with aqueous ink compositions prepared Example 1 to 5 maintain excellent dispersibility compared with those ball-point pens charged with aqueous ink compositions prepared in Comparative Example 1 to 5 (Comparative Examples 1 to 5 of aqueous ink composition containing the spherical resin particles) because the titanium oxide therein hardly precipitates. Of course, those ball-point pens charged with aqueous ink compositions prepared in Example 1 to 5 maintain excellent stability to dispersibility after the storage regardless of the position of the writing tip oriented downward or upward. Further, those ball-point pens charged with aqueous ink compositions prepared in Example 1 to 5 have excellent writing characteristic.

Accordingly, the present invention can provide an aqueous ink composition for ball-point pens, which has high concealing power, an excellent writing characteristics and excellent stability to dispersibility due to its capability to prevent the titanium oxide from precipitating.

As can be understood from the table 6 and the table 7, those aqueous ink compositions containing the titanium oxide together with the ethylene-bis melamine as an alkylene-bis-melamine derivative (those aqueous ink compositions prepared in Example 6 to 12) and those aqueous ink compositions containing the titanium oxide, the ethylene-bis-melamine and the particles of polymer (those aqueous ink compositions prepared in Example 13 to 22) have higher concealing power than do those aqueous ink compositions containing only the ethylene-bis-melamine (those aqueous ink compositions prepared in Comparative Example 6 and 7). With those aqueous ink compositions prepared in Example 6 to 22, the color of ink in the ink container tube can be recognized through a transparent or semitransparent ink container tube.

Those ball-point pens charged with aqueous ink compositions prepared in Example 6 to 22 show equal or better results than those charged with aqueous ink compositions prepared in Comparative Example 6 to 8 in tests of stability to dispersibility by centrifugation, storage with the writing tip oriented upward and downward.

Moreover, those ball-point pens charged with aqueous ink compositions prepared in Example 6 to 22 exhibit much better writing characteristic compared to those charged with aqueous ink compositions prepared in Comparative Example 6 to 8.

Among ink compositions prepared in Examples, particularly among those of Example 13 to 22 containing the particles of polymer, those ink compositions containing the flat-shaped resin particles have better stability to dispersibility compared with those ink compositions containing the spherical resin particles. Besides, those ink compositions containing the flat-shaped resin particles have better writing characteristic than those containing the spherical resin particles.

Accordingly, the present invention can provide an aqueous ink composition for ball-point pens, which has excellent stability to dispersibility due to its capability to prevent the titanium oxide from precipitating, forms writing portion with high concealing power, and has an excellent writing characteristics.

INDUSTRIAL APPLICABILITY

The aqueous ink composition of the present invention can prevent the precipitation of the titanium oxide because it contains the titanium oxide, the viscosity modifier and the flat-shaped resin particles and, hence, its stability to dispersibility is excellent. The concealing power of the writing portion of the present aqueous ink composition is high and its writing characteristic is excellent.

The aqueous ink composition containing the alkylene-bis-melamine derivative and the titanium oxide as a white pigment can prevent the precipitation of the titanium oxide and, hence, its stability to dispersibility is excellent. The concealing power of the writing portion of the present ink composition is high. Further, its writing characteristic is excellent. By adding the particles of polymer, specifically the flat-shaped resin particles, the stability to dispersibility of the ink composition can be improved even more.

The aqueous ink composition of the present invention is usable as an aqueous ink composition for ball-point pens with high viscosity type (specifically, that of gel type).

What is claimed is:

1. An aqueous ink composition for ball-point pens comprising, titanium oxide as a white pigment, a viscosity modifier and flat-shaped resin particles, wherein said aqueous ink composition has a viscosity ranging from 100 cps to 20000 cps at 20° C. and wherein precipitation of the titanium oxide is prevented.

2. An aqueous ink composition for ball-point pens as set forth in claim 1, further including a colored coloring agent.

3. An aqueous ink composition for ball-point pens as set forth in claim 2, wherein said coloring agent is a pigment.

4. An aqueous ink composition for ball-point pens as set forth in claim 1, wherein the average particle diameter of said flat-shaped resin particles is 0.05 $\mu$m to 10 $\mu$m.

5. An aqueous ink composition for ball-point pens as set forth in claim 1, wherein the content of said flat-shaped resin particles is 1% by weight to 35% by weight with respect to the total amount of the aqueous ink composition.

6. An aqueous ink composition for ball-point pens as set forth in claim 1, wherein the content of the titanium oxide is 5% by weight to 55% by weight with respect to the total amount of the aqueous ink composition.

7. An aqueous ink composition for ball-point pens as set forth in claim 1, wherein said viscosity modifier is a polysaccharide.

8. An aqueous ink composition for ball-point pens as set forth in claim 1, wherein the content of the viscosity modifier is 0.1% by weight to 2% by weight with respect to the total amount of the aqueous ink composition.

9. An aqueous ink composition for ball-point pens as set forth in claim 1, further comprising alkylene-bis-melamine derivatives represented by the general formula (1) as white pigment

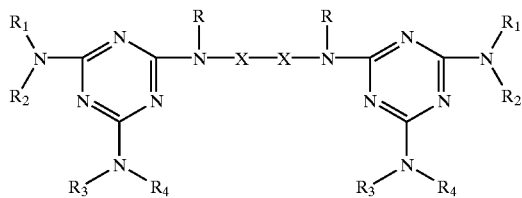
(1)

wherein R represents is selected from a hydrogen atom, an alkyl group having 1 to 4 carbon atoms and an alicyclic group; $R_1$, $R_2$, $R_3$, and $R_4$ are the same or different, each being selected from a hydrogen atom and an alkyl group having 1 to 4 carbon atoms, wherein $R_1$ and $R_2$, $R_3$ and $R_4$ may form a heterocyclic group together with a nitrogen atom; and x represents an alkylene group having 2 to 3 carbon atoms.

10. A ball-point pen comprising an ink container charged with said aqueous ink composition for ball-point pens as recited in claim 1.

11. An aqueous ink composition for ball-point pens comprising titanium oxide as a white pigment, polysaccharide as a viscosity modifier and flat resin particles, the aqueous ink composition having a viscosity ranging from 100 cps to 20,000 cps at 20° C. and wherein precipitation of the titanium oxide is prevented.

12. An aqueous ink composition for ball-point pens comprising titanium oxide as a white pigment, polysaccharide as a viscosity modifier, and flat resin particles, the aqueous ink composition having a viscosity ranging from 3000 cps to 9000 cps at 20° C. and wherein precipitation of the titanium oxide is prevented.

* * * * *